United States Patent Office 3,389,015
Patented June 18, 1968

3,389,015
DICYCLOPENTADIENE POLYMER MODIFIED POLYESTER WIRE ENAMEL AND VARNISH
Luciano C. Scala, Murrysville, and Frank A. Sattler, Monroeville, Pa., assignors to Westinghouse Electric Corporation, Pittsburgh, Pa., a corporation of Pennsylvania
No Drawing. Filed Feb. 27, 1964, Ser. No. 347,694
12 Claims. (Cl. 117—232)

ABSTRACT OF THE DISCLOSURE

A resinous composition is prepared by reacting a fatty acid modified polyester with a dicyclopentadiene polymer at temperatures and times sufficient to advance the product to a ball and ring value of about 80° C. to 90° C. An aromatic petroleum fraction having a distillation range of about 400° to 700° F. is then promptly added to the reaction mix. The resulting varnish is applied to electrical conductors and cured to provide improved insulating coatings.

---

This invention relates to compositions especially useful for insulation purposes and in particular concerns varnish compositions and electrical products including cured wire enamel and varnish compositions of the invention.

For electrical equipment that is subject to temperatures in the order of 130° C. (class B applications) there has been a need for improved insulation systems, especially wire enamels and varnishes for electrical conductors of motors, transformers, current controls and the like. If economy could be ignored, wire enamels and varnishes developed for higher temperature applications could be used. That cannot be done since economy is of prime importance, and accordingly there is a considerable need to provide wire enamels and varnishes for this general field of application having either better properties or lower cost, or both, than presently available materials.

It is therefore a primary object of the present invention to provide low cost, high quality wire enamels and varnishes having excellent flexibility and good heat shock resistance that are especially useful for electrical applications of the class B type.

Another object of the invention is to provide modified polyester type wire enamels and varnishes in accordance with the foregoing object.

Another object of the invention is to provide electrical conductors insulated with modified polyester wire enamels of this invention.

Other objects will be apparent from time to time from the following detailed description and discussion.

These and other objects are obtained in accordance with our invention in which wire enamels and varnish compositions comprising a polyester produced with particular fatty acids and modified with dicyclopentadiene polymers are provided. The resulting varnish, when applied to conductors and cured, provides excellent properties as electrical insulation at temperatures of the order of 130° C. and yet is of modest cost.

Thus broadly the invention involves a polyester produced with a mixture of polyols, high molecular weight fatty acids and aromatic dicarboxylic acids, with the resulting product being modified by reaction with a dicyclopentadiene polymer. The modified polyester produced is dissolved in a high boiling aromatic petroleum hydrocarbon to provide a varnish composition that can be applied in the conventional manner.

The polyester of the varnish composition is produced from a mixture of saturated aliphatic polyols containing at least 2 carbon atoms per molecule, organic aromatic dicarboxylic acids and mono- and di-unsaturated aliphatic monocarboxylic acids having 15 to 20 carbon atoms per molecule along with hardening and curing agents if desired. The resulting reaction product is then reacted with the dicyclopentadiene polymer. Suitable polyols containing at least 2 carbon atoms per molecule, for example 2 to 10 or more carbon atoms per molecule, that can be employed in preparing the polyester of the invention include glycerol, trimethylolethane, trimethylolpropane, bis-glycol, ethylene glycol, neopentyl glycol, 1,4-butanediol and mixtures thereof. About 0.8 to 1.4 mols of the polyol or polyol mixture is used per mol of acids.

The acids used in this invention are of both aliphatic and aromatic type. Aromatic acids used in this invention comprise isophthalic acid, phthalic acid, terephthalic acid or mixtures thereof or the like acids containing 8 to 15 or more carbon atoms per molecule. The unsaturated aliphatic acids employed contain 15 to 20 carbon atoms per molecule and typical examples thereof are oleic acid, linoleic acid, elaidic acid and the like. Mixtures of such acids are available commercially and constitute the preferred aliphatic acids used in this invention. For example, mixtures of linoleic and oleic acid are commercially available as tall oil fatty acids and comprise generally about 85 to 99 percent of the mixture. Generally the acids are used in a mol ratio of about 0.8 to 1.2 mols of aromatic acid per mol of aliphatic acid. It is believed that the fatty acids provide a bonding bridge between the polyester and the dicyclopentadiene polymer.

The foregoing components generally are admixed along with a conventional polyester condensation catalyst, for example tetraisopropyltitanate or other conventional catalysts, and reacted by heating to a temperature of about 160° to 190° C. in about 40 to 70 minutes. Then the temperature is slowly raised about 10° to 20° C. (i.e., to a level of about 195° to 210° C.) in about 1 to 3 hours or more. This causes polyester condensation to occur. Thereafter there is added to the reaction mix a dicyclopentadiene polymer and the temperature of the mixture is raised 20° C. to 30° C. or more as rapidly as possible consistent with the avoidance of foaming or other deleterious circumstance, that is to a level of about 220° to 225° C. or higher. This temperature is maintained and reaction continued until a sample thereof has a Ball and Ring value of about 80° C. to 90° C. and preferably 85° C. to 90° C. This occurs normally in about 1 to 2 hours. If heating is continued beyond this point, gelation would occur. Thereupon the reaction product is cut or diluted with a solvent. The solvents that can be used characteristiclly are aromatic petroleum fractions generally having a flash point of about 200° to 250° F., a distillation range of about 400° to 700° F. and an aromatics content of at least 85 mol percent. Such solvents are commonly available and are inexpensive. As is apparent, they are relatively free from highly volatile components. Moreover, it is believed that these solvents have a plasticizing effect, in part, on the wire enamel and varnish resin compositions. Generally, sufficient solvent is added to result in a solution containing 20 to 40 weight percent non-volatiles.

The dicyclopentadiene resin used suitably is that prepared by the polymerization of petroleum fractions boiling at about 100° to 300° C. and containing as the major polymerizable components dicyclopentadiene, cyclopentadiene, styrene, cyclohexadiene and methyl derivatives thereof, with dicyclopentadiene predominating. Suitably such dicyclopentadiene polymers have a melting range of about 98° to 155° C. ball and ring, a specific gravity of about 1.060 to 1.125; a molecular weight average of about 600 to 1500 and an iodine number of 125 to 175. These polymers are prepared by conventional procedures, for example as taught in U.S. Patent No. 2,255,409. Generally about 0.05 to 0.3 mol of this resin is used per 2 to 3 mols of the polyols employed in forming the polyester. Other resins, such as the coumarone-indene resins prepared by the polymerization of coal tar fractions having boiling ranges of about 140° to 200° C. can be substituted in small amounts, that is up to about 20 mol percent, for the dicyclopentadiene polymer.

The wire enamel compositions of the present invention can be applied to electrical conductors using either dip coating or die coating methods. These resin solutions can also be applied over an insulating wrapping, such as a paper or glass fiber tape or the like. They can also be used as impregnating varnishes on motors, transformers, or other electrical coils. Subsequent to application of these resins, baking is required at temperatures of the order of 150° C. for several hours to 500° C. for minutes.

The invention will be described further in conjunction with the following specific examples in which the details are given for purposes of illustration.

Example I

About 1.25 mols of glycerol, 1.25 mols of trimethylolethane, 2 mols of isophthalic acid, 1 mol of tall oil fatty acids and 4 grams of isopropyltitanate were placed in a reaction vessel and heated to 170° C. over a period of 1½ hours. The reaction mass was then heated slowly to 200° C. over a period of 2 hours. Thereupon a commercial dicyclopentadiene polymer (LX685, Neville Chemical Co.) in an amount of 100 grams was added and heating was continued with the temperature being raised at a rate of 15° C. per hour. Samples were taken until a thread forming stage was encountered, which occurred at a temperature of about 260° C. to 265° C., and the material had a ball and ring value of about 81° C. to 85° C. Thereupon heating was stopped and 1600 cc. of a commercial petroleum base high boiling, aromatic naphtha solvent was added and the mixture stirred. The resulting clear solution had a viscosity of 30 seconds Zahn No. 1 cup when further diluted to 30% solids with xylene. The yield obtained was 94 percent of theoretical solids.

This wire enamel was used to coat No. 17 AWG wire in a 15-foot coating tower at 430° C. Six coats were applied using the dip-coating method at speeds ranging from 15 to 28 feet per minute. The film thickness was 1.5 to 1.7 mils. No. 32 AWG wire was coated in a 6-foot tower at 600° F. at a rate of 30 to 90 feet per minute with six passes using felt wipers. Film thickness on the No. 32 wire was 0.6 to 0.85 mil. Both enamelled wire sizes were tested for elongation, abrasion resistance, heat shock, thermal stability, and solubility at room temperature in common solvents such as toluene, and were found to be superior in all instances to commercial formulations of the oleoresinous type.

The following table shows a comparison between the properties of the modified polyester wire enamel of this invention prepared and applied as in the foregoing example, and those of a commercial oleoresinous wire enamel.

| Wire Properties | Commercial Sample of No. 18 AWG Oleoresinous Wire | Modified Polyester on No. 17 AWG 19 ft. Tower Speed | Modified Polyester on No. 17 AWG 22 ft. Tower Speed |
| --- | --- | --- | --- |
| Scrape Hardness | 23–24 oz | 42 oz | 43 oz. |
| GESA, Strokes (scrape abrasion) | 2–3 | 12 | 6. |
| Flexibility | Fails, 5% plus 1X Mandrel | OK—15% plus 1X | OK—30% plus 1X. |
| Heat Shock (4X Mandrel) | Fails at 125° C | OK—125° C., Marginal at 150° C. | OK—125° C., Marginal at 150° C. |
| Cut-thru temperature | 190° C | 375° C | 390° C. |
| Thermal Stability | Estimated 120° C | Estimated 130° C | Estimated 130° C. |
| Hydrolytic Stability | Fair | Fair | Fair. |
| Toluene, immersion at 25° C | Poor | Good | Good. |
| Jerk | Fails | OK | OK. |
| Build | 2.6 mils | 2.8 mils | 2.8 mils. |

Example II

About 1 mol of glycerol and a mol of tall oil fatty acids analyzing at about 46 percent oleic acid and 51 percent linoleic acid were stirred together. Then a mol of trimethylolethane, 1.5 mols of isophthalic acid and about 5 grams of tetraisopropyltitanate were added. The mixture was heated to about 175° C. in 55 minutes. The temperature was then raised to 200° C. over a period of about 2 hours. About 0.1 mol of dicyclopentadiene resin having a molecular weight of about 900 was added to the mix; the temperature was further raised at a rate such that it reached 225° C. in about 45 minutes. This temperature was maintained until a sample showed a ball and ring value in the range of 85° to 90° C. Thereupon a commercial heavy aromatic naphtha was added thereto to produce a clear varnish solution.

The enamel produced in accordance with Example II has been applied to wire at speeds ranging up to about 50 feet per minute in commercial wire coating towers. Standard Locked Rotor tests on the enamelled wire showed the enamel to be far superior to other wire enamels currently in use for the applications contemplated. For example, Standary Locked Rotor tests run on fractional horsepower motors gave an average value of 90 seconds as compared with 60 seconds for the best commercial thermally stable polyesters.

From the foregoing discussion, description and examples, it is apparent that the present invention provides unique, highly effective and inexpensive enamel and varnish compositions particularly useful for electrical insulation at intermediate temperature applications. While the invention has been described with respect to specific materials and the like, it should be appreciated that changes therefrom can be made without departing from its scope.

We claim:

1. A method of preparing a resinous composition suitable for use in insulating electrical conductors comprising heating a mixture of (A) a polyester derived from the esterification of (1) a saturated aliphatic polyol containing at least 2 carbon atoms and (2) a mixture of organic acids, the acids comprising (a) an aromatic dicarboxylic acid and (b) an unsaturated aliphatic acid containing from 15 to 20 carbon atoms per molecule, the molar ratio of (a) to (b) being from about 0.8:1 to 1.2:1 and the molar ratio of (1) to (2) being from about 0.8:1 to 1.4:1 and (B) a dicyclopentadiene polymer having an average molecular weight within the range of 600 to 1500 and a melting range of about 98° to 155° C. until the reaction mixture has a ball and ring value of about 80° to 90° C. and thereupon promptly diluting the reaction mixture with an aromatic petroleum fraction having an aromatics content of at least 85 weight percent and a distillation range of about 400° to 700° F.

2. The method of claim 1 wherein the dicyclopentadiene polymer is present in the mixture in a ratio of 0.05 to 0.3 mol per 2 to 3 mols of polyol.

3. The method of claim 2 wherein the polyol is selected from the group consisting of glycerol, trimethylolethane, trimethylolpropane, bis-glycol, ethylene glycol, neopentyl glycol, 1,4-butanediol and mixtures thereof, the aromatic acid is selected from the group consisting of isophthalic acid, phthalic acid, terephthalic acid and mixtures thereof and the unsaturated aliphatic acid is selected from the group consisting of oleic acid, linoleic acid, elaidic and mixtures thereof.

4. The method of claim 2 wherein the polyol is selected from the group consisting of glycerol, trimethylolethane and mixtures thereof, the aromatic acid is isophthalic acid and the unsaturated aliphatic acid is a tall oil fatty acid.

5. A method of preparing a varnish composition comprising mixing saturated aliphatic polyols containing at least 2 carbon atoms per molecule and tall oil fatty acids in a ratio of about 2½ mols of polyol per mol of tall oil acid, adding thereto about 2 mols of aromatic dicarboxylic acid containing 8 to 15 carbon atoms per molecule and a small amount of catalyst, heating the resulting mixture to a temperature in the range of about 160° to 190° C. in about 40 to 70 minutes, then slowly raising the temperature of the reaction mixture to about 195° to 210° C. in an additional 1 to 3 hours, adding to the reaction mix a dicyclopentadiene resin having an average molecular weight within the range of 600 to 1500 and a melting range of about 98° to 155° C., promptly thereafter raising the temperature of the reaction mixture to at least about 220° to 235° C. and maintaining that temperature until a sample of the reaction mix has a ball and ring value of about 80° to 90° C., thereupon promptly diluting the reaction mix with an aromatic petroleum fraction having an aromatics content of at least 85 weight percent and a distillation range of about 400° to 700° F., and recovering the resulting varnish.

6. A method in accordance with claim 5, said dicarboxylic acid comprising isophthalic acid.

7. A method of preparing a varnish composition comprising mixing glycerol and tall oil fatty acids containing 15 to 20 carbon atoms per molecule, adding trimethylolethane, isophthalic acid and a small amount of catalyst thereto, the amounts of polyols and acids being in about equal molar amounts, heating the resulting mixture to a temperature in the range of about 160° to 190° C. in about 40 to 70 minutes, thereafter slowly raising the temperature of the reaction mixture to 195° to 210° C. in an additional 1 to 3 hours, adding to the reaction mix a dicyclopentadiene resin having an average molecular weight within the range of 600 to 1500 and a melting range of about 98° to 155° C., promptly thereafter raising the temperature of the reaction mixture to about 220° to 235° C. and maintaining this temperature until a sample of the reaction mix has a ball and ring value of about 80° to 90° C., thereupon promptly diluting the reaction mix with an aromatic petroleum fraction having an aromatics content of at least 85 weight percent and a distillation range of about 400° to 700° F.

8. A liquid wire enameling composition comprising a resin prepared from an admixture of (A) a polyester derived from the esterification of (1) a saturated aliphatic polyol containing at least 2 carbon atoms and (2) a mixture of organic acids, the acids comprising (a) an aromatic dicarboxylic acid and (b) an unsaturated aliphatic acid containing from 15 to 20 carbon atoms per molecule, the molar ratio of (a) to (b) being from about 0.8:1 to 1.2:1 and the molar ratio of (1) to (2) being from about 0.8:1 to 1.4:1 and (B) a dicyclopentadiene polymer having an average molecular weight within the range of 600 to 1500 and a melting range of about 98° to 155° C., the polymer being present in a ratio of 0.05 to 0.3 mol per 2 to 3 mols of polyol, the admixture having been heated to a ball and ring value of about 80° to 90° C. and thereupon promptly diluted with an aromatic petroleum fraction having an aromatics content of at least 85 weight percent and a distillation range of about 400° to 700° F.

9. The composition of claim 8 wherein the polyol is selected from the group consisting of glycerol, trimethylolethane and mixtures thereof, the aromatic acid is isophthalic acid and the unsaturated aliphatic acid is a tall oil fatty acid.

10. A coated electrical conductor wherein the coating comprises the solid heat reaction product of the liquid enameling composition of claim 8.

11. A coated electrical conductor wherein the coating comprises the solid heat reaction product of the liquid enameling composition of claim 9.

12. A process of coating an electrical conductor which comprises the steps of applying the composition of claim 8 to an electrical conductor, and then heating the coated conductor to a temperature of about 150° to 500° C. to cure the composition on the conductor.

References Cited

UNITED STATES PATENTS

| 2,404,836 | 7/1946  | Gerhart et al. | 260—22 |
| 2,861,047 | 11/1958 | Heckles | 260—22 |
| 2,873,215 | 2/1959  | Quigley et al. | 117—132 |
| 3,057,824 | 10/1962 | Le Bras et al. | 260—22 |
| 3,088,927 | 5/1963  | Dissen | 260—22 |
| 3,112,223 | 11/1963 | Logemann et al. | 117—232 |

DONALD E. CZAJA, *Primary Examiner.*

R. W. GRIFFIN, *Assistant Examiner.*